United States Patent
Tarnanen

(10) Patent No.: US 9,870,560 B2
(45) Date of Patent: Jan. 16, 2018

(54) ONLINE PAYMENT METHOD AND A NETWORK ELEMENT, A SYSTEM AND A COMPUTER PROGRAM PRODUCT THEREFOR

(75) Inventor: Jarkko Tarnanen, Masku (FI)

(73) Assignee: TELIA COMPANY AB, Stockholm (SE)

( * ) Notice: Subject to any disclaimer, the term of this patent is extended or adjusted under 35 U.S.C. 154(b) by 232 days.

(21) Appl. No.: 13/584,164

(22) Filed: Aug. 13, 2012

(65) Prior Publication Data

US 2013/0054414 A1 Feb. 28, 2013

(30) Foreign Application Priority Data

Aug. 25, 2011 (EP) .................................... 11178772

(51) Int. Cl.
*G06Q 20/38* (2012.01)
*G06Q 20/42* (2012.01)
*G06Q 20/32* (2012.01)

(52) U.S. Cl.
CPC ....... *G06Q 20/3255* (2013.01); *G06Q 20/385* (2013.01); *G06Q 20/425* (2013.01)

(58) Field of Classification Search
CPC ........... G06Q 30/0601; G06Q 30/0609; G06Q 30/0635; G06Q 20/3255; G06Q 20/385; G06Q 20/425
USPC .................................................. 705/26.1, 75
See application file for complete search history.

(56) References Cited

U.S. PATENT DOCUMENTS

| | | | | |
|---|---|---|---|---|
| 6,078,908 A * | 6/2000 | Schmitz | ................ | G06F 21/335 340/5.28 |
| 6,975,937 B1 * | 12/2005 | Kantarjiev | ............. | G06Q 10/08 340/990 |
| 6,993,658 B1 * | 1/2006 | Engberg | ................ | G06F 21/43 379/114.2 |
| 7,373,516 B2 * | 5/2008 | Ashok | ................... | G06F 21/31 713/183 |
| 8,356,171 B2 * | 1/2013 | Shatzkamer et al. | ......... | 713/155 |

(Continued)

FOREIGN PATENT DOCUMENTS

EP 1 065 634 A1 1/2001
WO 02/23303 A2 3/2002

OTHER PUBLICATIONS

European Search Report, dated Dec. 14, 2011, from corresponding European application.

*Primary Examiner* — Kevin Flynn
*Assistant Examiner* — Omar Zeroual
(74) *Attorney, Agent, or Firm* — Young & Thompson

(57) ABSTRACT

The invention concerns a payment arrangement in an online shopping. In the method a request for a transaction code containing at least predefined user-related identification information is received. The content of the request is compared to stored information and, in response to a positive outcome of the comparison, a transaction code is generated, stored and delivered to the requesting party. In the next phase an inserted transaction code is received for verification and it is compared to the generated transaction code stored. In response to a positive outcome of the comparison the payment information is confirmed to the requesting entity. The invention also relates to a network element, a system and a computer program product implementing the method.

17 Claims, 3 Drawing Sheets

(56) References Cited

U.S. PATENT DOCUMENTS

| | | | | |
|---|---|---|---|---|
| 8,555,355 B2* | 10/2013 | Rathbun | | H04L 9/3213 726/11 |
| 8,572,377 B2* | 10/2013 | Kalbratt | | G06F 21/33 380/277 |
| 8,831,979 B1* | 9/2014 | Gerson | | H04L 63/0421 455/414.3 |
| 8,868,921 B2* | 10/2014 | Cramer | | H04L 63/0838 713/184 |
| 9,119,076 B1* | 8/2015 | Gubbi | | H04W 12/12 |
| 2002/0035539 A1* | 3/2002 | O'Connell | | G06Q 20/02 705/39 |
| 2003/0154160 A1* | 8/2003 | Arndt | | G06Q 40/00 705/37 |
| 2004/0039651 A1* | 2/2004 | Grunzig | | G06Q 20/04 705/26.1 |
| 2004/0243299 A1* | 12/2004 | Scaer | | G08G 1/202 701/522 |
| 2006/0206709 A1* | 9/2006 | Labrou | | G06Q 20/18 713/167 |
| 2007/0251997 A1* | 11/2007 | Brown | | G06K 7/0008 235/380 |
| 2007/0256120 A1* | 11/2007 | Shatzkamer | | H04L 63/08 726/5 |
| 2007/0260556 A1* | 11/2007 | Pousti | | G06Q 20/14 705/75 |
| 2009/0075630 A1* | 3/2009 | McLean | | G06F 21/602 455/411 |
| 2009/0089331 A1* | 4/2009 | Boaz | | G07B 17/00024 |
| 2009/0104888 A1* | 4/2009 | Cox | | G06F 21/31 455/410 |
| 2009/0106138 A1* | 4/2009 | Smith | | G06Q 20/385 705/35 |
| 2009/0144161 A1* | 6/2009 | Fisher | | G06Q 20/20 705/16 |
| 2009/0158033 A1* | 6/2009 | Jeong | | H04L 63/068 713/156 |
| 2009/0290715 A1* | 11/2009 | Mityagin | | G06F 21/335 380/278 |
| 2010/0146263 A1* | 6/2010 | Das | | G06Q 20/385 713/155 |
| 2010/0197352 A1* | 8/2010 | Runstedler | | G06F 3/0233 455/566 |
| 2010/0299731 A1* | 11/2010 | Atkinson | | G06F 21/42 726/6 |
| 2011/0029436 A1* | 2/2011 | Norvell | | G06F 21/31 705/67 |
| 2011/0288969 A1* | 11/2011 | Wiech | | G06F 17/30286 705/30 |
| 2012/0047071 A1* | 2/2012 | Mullen | | G06Q 20/3278 705/44 |
| 2012/0310832 A1* | 12/2012 | Hammad | | G06Q 10/087 705/44 |
| 2013/0054414 A1* | 2/2013 | Tarnanen | | G06Q 20/3255 705/26.41 |
| 2013/0060688 A1* | 3/2013 | Hurst | | G06Q 40/02 705/41 |
| 2013/0151359 A1* | 6/2013 | Fujisawa | | G06Q 20/204 705/17 |
| 2013/0346317 A1* | 12/2013 | Korkis | | G06Q 40/00 705/67 |
| 2014/0052638 A1* | 2/2014 | Chung | | G06Q 20/322 705/44 |

* cited by examiner

ONLINE PAYMENT METHOD AND A NETWORK ELEMENT, A SYSTEM AND A COMPUTER PROGRAM PRODUCT THEREFOR

TECHNICAL FIELD

The invention concerns in general the technical field of financial transaction data exchange. Especially, the invention concerns a payment arrangement in online shopping.

BACKGROUND OF THE INVENTION

Internet shopping has made its breakthrough in recent years. In order to shop online, one must be able to have access to a computer as well as a credit card or a debit card. In the case of physical goods, the delivery of the purchased product must be arranged in a convenient way and it should be available directly from the online shop.

Due to the delivery of personal financial transaction data over the Internet, security plays the most important role in online shopping. Multiple security related arrangements have been implemented in order to raise the security level. Some of the prior art security related arrangements originate from the security systems of the financial institution e.g. granting a credit card to the user. A typical example of such a security related issue is that each credit card comprises a specific credit card number and in addition thereto, there is a so called CVC (Card Verification Code) number for further controlling the card. It will be appreciated that several alternative security methods relating to payment are introduced due to the fact that there are multiple other payment methods available besides the credit card.

Furthermore, the telecommunication connections are typically secured by some encryption method(s). TLS (Transport Layer Security) and SSL (Secure Sockets Layer) are widely used methods, which are cryptographic protocols providing communication security over the Internet.

It is clear that the security shall be arranged between all operators involved in the shopping transaction i.e. between the user and the web shop as well as financial institution if needed for the transaction.

A typical procedure in online shopping is that a user first enters a web shop over the Internet and finds a product he/she wants to purchase. The user places an order normally through a secured channel, e.g. the connection is secured with SSL. The order is registered in the web shop entity and after inputting the necessary information relating e.g. to the delivery and to the delivery address, the payment procedure is started. The payment procedure can be arranged e.g. in such a manner that request for the payment information is arranged inside the web shop. In practice, it means that the system requests a desired payment method as well as any other necessary information to accomplish the payment for the product in a manner that is secure for users i.e. customers, but also for the web shop itself. A secure payment method for the web shop means that the web shop is able to receive confirmation that the customer pays the purchase. The confirmation may be derived from the information received from the customer or alternatively some other entity, such as a financial institution, can confirm it. If the web shop system is configured in such a manner that the financial institution shall confirm the payment of the purchase, the information received from the customer is delivered to the financial institution for further checking. If the information matches with the already existing information in the possession of the financial institution, the payment can be confirmed to the web shop. After confirmation the purchase order can be confirmed by the web shop. In response to the confirmation of the purchase order, the web shop can start the delivery of the product i.e. by enabling e.g. the download of a digital data from the server or prepare and arrange the shipment in the case of a physical product.

To improve the security further, methods utilizing a mobile terminal and a mobile communication network have been developed. For example, the whole payment procedure is arranged through a mobile terminal and a mobile communication network so that the user i.e. the customer receives a confirmation code from the web shop and to confirm the purchase, he/she needs to deliver the code with an SMS (short message) back to the web shop entity. In some embodiments the payment of the purchased product is arranged to be included in the telephone bill.

The prior art solutions for online payment comprise several drawbacks. Typically the situation is that if one wants to improve security, it directly increases the complexity of the whole system. This may be challenging especially to smaller players due to the fact that such parties have limited resources to develop and amend their systems. Especially, bearing in mind that one typical phenomenon in connection with web shops is that launching a shop is quite easy and is possible even with small resources, there is a need for technical solutions that can be implemented even by the smaller parties.

Normally, the financial institutions set the framework for security issues in any payment method. This is due to the fact the financial institutions normally "own" the user i.e. web shop customer by means of offered payment method, such as a credit card. The financial institutions have developed their systems primarily to serve traditional shopping methods and merely extended the systems to serve the online shopping as well. As a consequence their systems are very heavy and thus difficult to change if needed.

One drawback with respect to credit card based payment systems is that the payment transactions are based on the credit card number and the CVC (Card Verification Code). Both can be found in the credit card. Thus, if the credit card ends up in the wrong hands, it is possible to use the credit card illegally. Another drawback is security breaches in web shops, hacking, phishing and similar risks which expose sensitive customer data to unauthorized use.

Another aspect is that any payment method developed for online shopping shall be easy to use from the end user's i.e. the web shop customer's perspective. The method shall be a simple one and especially such that the user feels safe during web shopping. Advantageously one payment method is applicable in multiple instances so that the user becomes familiar with the system. This increases trust in web shopping and as a consequence web shopping gains popularity.

SUMMARY OF THE INVENTION

An objective of the invention is to provide a method and a network element, a system and a computer program product for improving security of payment transactions. Another objective of the invention is that the method, the network element, the system and the computer program product for improving security of payment transaction is arranged in such a manner that it requires only minimal changes to existing systems of a web shop if any.

The objectives of the invention are achieved by separating physically a transaction code, such as CVC (Card Verification Code), from the respective credit card and utilizing modern communication means for achieving secure payment verification to be used in online purchasing.

A method according to the invention is characterized by the steps recited in the characterizing part of the independent claim directed to a method.

A network element according to the invention is characterized by the features recited in the characterizing part of the independent claim directed to a device.

A system according to the invention is characterized by the features recited in the characterizing part of the independent claim directed to a system.

A computer program product according to the invention is characterized by the features recited in the characterizing part of the independent claim directed to a computer program product.

BRIEF DESCRIPTION OF THE INVENTION

The idea of the invention is to implement a more secure credit card payment method by minimizing changes in the existing web shop systems. The idea is based on the solution in which a credit card related transaction code, such as CVC in the existing systems, is physically separated from the credit card information by utilizing generally known communication technologies in requesting, generating and delivering a transaction specific transaction code. In a request for a transaction code some user related identification information is delivered over a communication network. Further, the transaction code generation is at least partly based on a comparison of delivered information and the stored information in the database storing user related information.

Further, the invention relates to a verification of a transaction code received from the user in the financial transaction system so that the web shop receives a confirmation of the payment of purchased products. As a result, the delivery of the purchased products can be initiated.

The exemplary embodiments of the invention described in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 1:
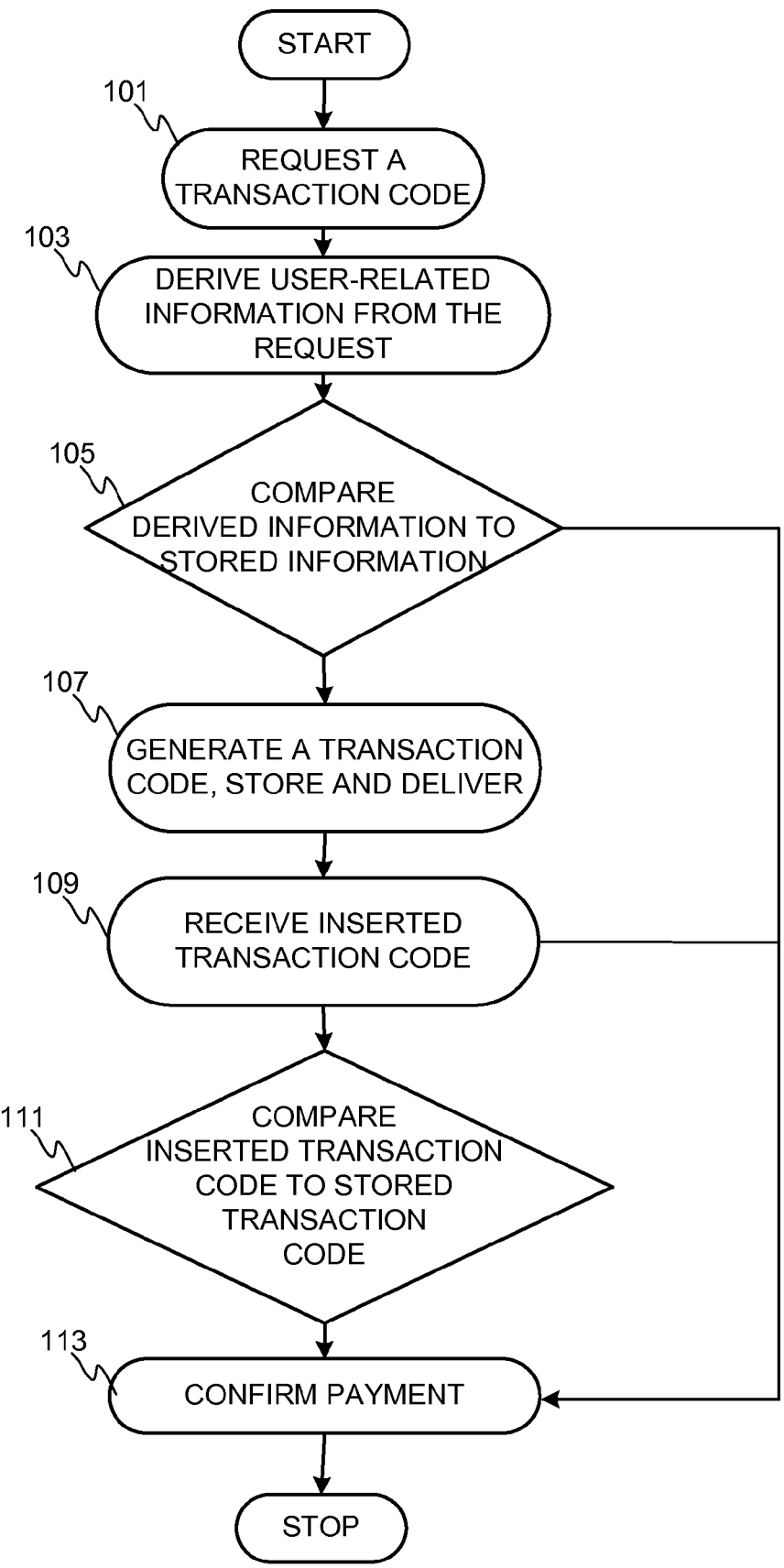
FIG. 1 illustrates a principle of the method according to the invention.
Figure 2:
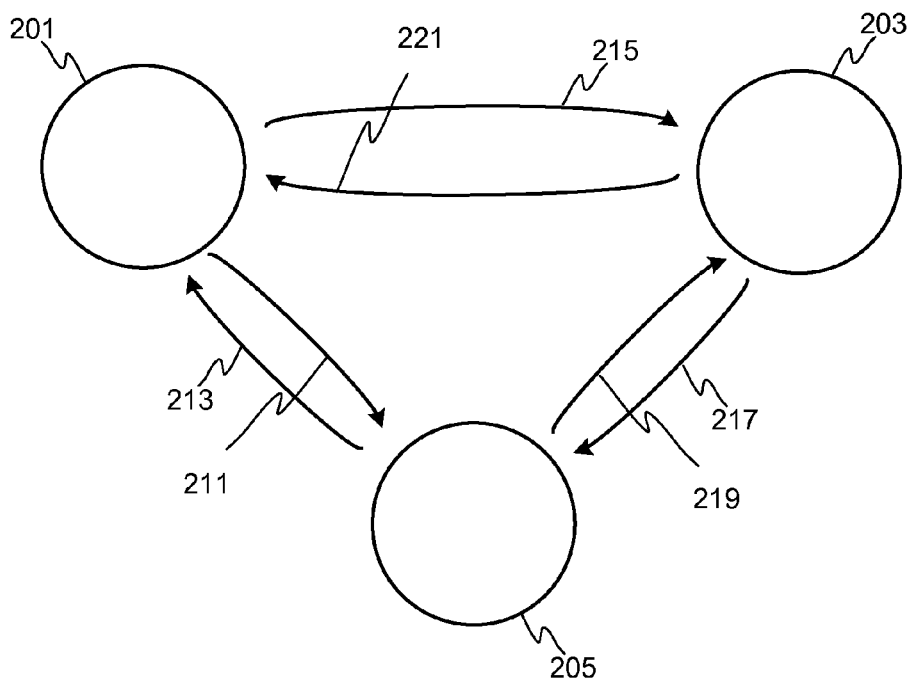
FIG. 2 illustrates an embodiment of the invention in which the method is applied.

FIG. 2 illustrates the principle of a method according to the invention. According to the invention a transaction code to be utilized in online shopping at least partly verifying and confirming the payment of the purchase is generated in response to a request from a party involved in the online shopping. The party can be a user i.e. a customer of the web shop. Alternatively, the party initiating the generation of a transaction code may be an entity representing the web shop.

According to the invention the request is delivered 101 to the transaction code generation means through a generally known communication channel. The communication channel can be arranged over a mobile communication network in such a manner that the user sends an SMS (short message) comprising a request for a transaction code to a predetermined address. The SMS containing the request for the transaction code is, according to an embodiment of the invention, a so called fixed mode SMS, which means that the structure of the message is pre-defined. If the delivered message does not follow the pre-defined structure, the receipt of the message does not initiate the generation of a transaction code. According to the invention the content of the message shall comprise identification information on the user, which is derived 103 from the request. By means of the user-related identification information the user can be recognized by a party issuing the transaction codes. Such party can be a financial institution. The content of the message may comprise a social security number (personal ID), credit card number, PIN (personal identity number), home address or any other information of the user and/or any combination of the mentioned, which can be used for identifying the user. The mobile phone number retrievable from the message can also be used together with the message content for verifying the user. In some preferred embodiments of the invention the content is such information, which cannot be easily accessed by 3rd parties. Such piece of information can be a social security number, for example.

Thus, the party issuing transaction codes verifies the user related identification information derived from the message by comparing 105 it with the stored information in the storage of the party generating the transaction codes. If a match is found in the first comparison, the generation of a transaction code for that specific instance can be initiated 107. According to an embodiment of the invention the transaction code is a random number with pre-determined length, e.g. four digits. Information on the generated transaction code is stored 107 in the database in connection with the user information requesting the transaction code. The stored information is at least the generated transaction code or rules for deriving it from the stored information.

According to another embodiment of the invention the request for a transaction code is received directly from the web shop. It can be a consequence of the web shop implementation i.e. when the user finds products to be purchased and starts placing an order in the system, the user is offered an opportunity to acquire a transaction code by inserting some information identifying the user and then clicking a button on the webpage. Proceeding in this manner the webpage delivers a request for a transaction code to a party granting and generating the transaction codes, such as a financial institution. Information identifying the user can be e.g. a credit card number or any similar information which can be used as an identifier for finding necessary information relating to the user in a database of the financial institution.

In response to the transaction code request and user identification, the system is configured to deliver 107 the created transaction code to the party requesting it. The transaction code can be delivered e.g. over a mobile communication network with an SMS or alternatively or in addition by email over Internet. The information on the channel to be used for delivering the transaction code to the user can be agreed in advance. For example, when a user is acquiring a credit card, the preferred way of delivering the transaction code can be agreed and this information is stored in the database of the financial institution granting the credit card. According to some other embodiment of the invention the information on the preferred way of delivering the transaction code is stored in the web shop database, e.g. customer relationship management system (CRM). The information from CRM is delivered to the party generating the transaction code when needed i.e. when requested or triggered by placement of a purchasing order. According to some further embodiment of the invention the delivery channel of the transaction code is requested from the user when he or she is making a purchase in the web shop. This is a preferred way due to the fact that the user can define a delivery channel available for him or her at that specific instance. This embodiment can be further developed so that the user cannot define the address i.e. phone number or email address in the context of the defining of the delivery channel, but the address is retrieved from the database of the party generating the transaction code. Alternatively, the user determines the address for delivery of the transaction code when requesting the code.

In the next step the user inserts a transaction code during the web shop session. The request for the transaction code may follow immediately after placing a purchase order or alternatively when making the payment. This depends on the implementation of the web shop and payment system. Additionally, some other information can be requested from the user i.e. customer.

After receiving the necessary information for confirming a payment for the purchase the system in the web shop is configured to deliver the inserted transaction code to the party confirming the payment. The party confirming the payment can be the financial institution that has delivered a generated transaction code to a user.

In response to receiving 109 an inserted transaction code with other information, if applicable the confirming party accesses its database and compares 111 if there is a match between the inserted transaction code and the transaction code information stored in the database. The transaction code stored in the database can be found by means of some user identification information delivered in connection with the inserted transaction code. Such information can be e.g. a credit card number, which is typically needed for online payments. If the second comparison shows that there is a match between the inserted transaction code and the transaction code stored in the database, a confirmation that the payment procedure is in order may be given and delivered 113 to the web shop. The type of the confirmation can be agreed on between the web shop and confirming party separately and is implemented in the communication of these two entities.

In response to the confirmation from the confirming party the web shop is ready to complete the purchase order and thus accept the order. According to some embodiment of the invention the web shop system is configured to print out a purchase confirmation on the display of the user so that the user sees that the online shopping has succeeded. Alternatively, the web shop can send a confirmation message to the user, e.g. by email and/or SMS.

The method according to the invention may comprise a counter for maintaining a value of the number of attempts to insert a transaction code during a web shop session. For example, a maximum limit of attempts is set in order to prevent misuse. If a mismatch between the stored transaction code and/or other information stored in the financial institution entity and inserted transaction code and/or other information is detected, a notification is given towards the web shop and the counter is updated. When the maximum limit set for the counter is reached, the financial institution may notify the web shop entity that the payment transaction is canceled. According to some embodiment of the invention the counter is set for maintaining a value for counting the validity time of a transaction code delivered in response to the request. If the counter reaches the validity time limit before such a transaction code is inserted for confirmation, the stored transaction code is invalidated. In some embodiment of the method according to the invention two counters are used. There is one counter for maintaining a value of the number of attempts and one for validity time measurement. The counters are configured to function similarly to the case of only one counter, but if either of the limits set for counters is reached, the verification is canceled.

FIG. 2 illustrates an embodiment in which the method of the invention described is applied. The figure comprises user entity 201, web shop entity 203 and financial institution entity 205. The user entity 201 discloses devices by means of which the user can communicate with external entities. The web shop entity 203 comprises servers and databases as well as communication means necessary for enabling an implementation of a web shop. The servers provide interfaces for consumer access to the web shop by as well as for exchanging information inside the web shop elements and external entities. The database may comprise information on the products being sold in the web shop as well as customer information. The communication means consist of necessary elements for implementing the communication with internal element in the web shop and external entities. The financial institution entity 205 comprises necessary servers and databases as well as communication means for generating necessary information for online shopping, such as transaction codes. Additionally, the financial institution entity 205 comprises information on users i.e. customers and different payment means per user, such as credit card information. Furthermore, the financial institution entity 205 comprise further information on the user, such as a name, a social security number (personal ID), credit card number, home address or any other information on the user, which can be used for identifying the user. According to some embodiments of the invention, the user may express his/her wishes (e.g. when acquiring a credit card) regarding the information to be stored in the financial institution entity 205 that is to be utilized in identifying the user in a context of a transaction code generation. To increase security, it is advantageous to use such identification information which is not available to 3rd parties. The financial institution entity 205 may also offer e.g. time dependent identification information to be stored and changed in a database. The user just needs to be aware, which information is valid at the time.

The procedure disclosed in FIG. 2 by means of arrows with respect to online shopping starts with a user request of a transaction code 211. The user makes the request 211 by sending an SMS over mobile communication network to financial institution. The SMS may comprise some user related identification information, which can be compared to the information already stored in the financial institution entity, such as a social security number. According to an embodiment of the invention the financial institution entity compares the delivered social security number and the mobile phone number derivable from the SMS to the information stored in the database of the financial institution entity. If a match is found, the financial institution entity generates a transaction code to be used in the web shopping and delivers it to the user 213. The delivery can be done by SMS or email, if an email address is available. In response to receiving the transaction code the user accesses a web shop and makes the purchase 215. For accomplishing the purchase the user inserts a transaction code with other information, such as credit card number, for completing the order. The web shop entity delivers 217 the received information or at least part of it to the financial institution entity. The financial institution entity verifies the received information comprising at least transaction code information with some other identification information by comparing it to stored information. If a match is found between at least the delivered transaction code information and the stored transaction code information, a confirmation of the valid payment operation can be given. According to the embodiment of the invention the financial institution entity delivers a confirmation message 219 to the web shop entity. In response to the confirmation message from the financial institution entity the web shop entity can express to the user a confirmation of the purchase order and/or the payment of the purchase 221.

Figure 3:
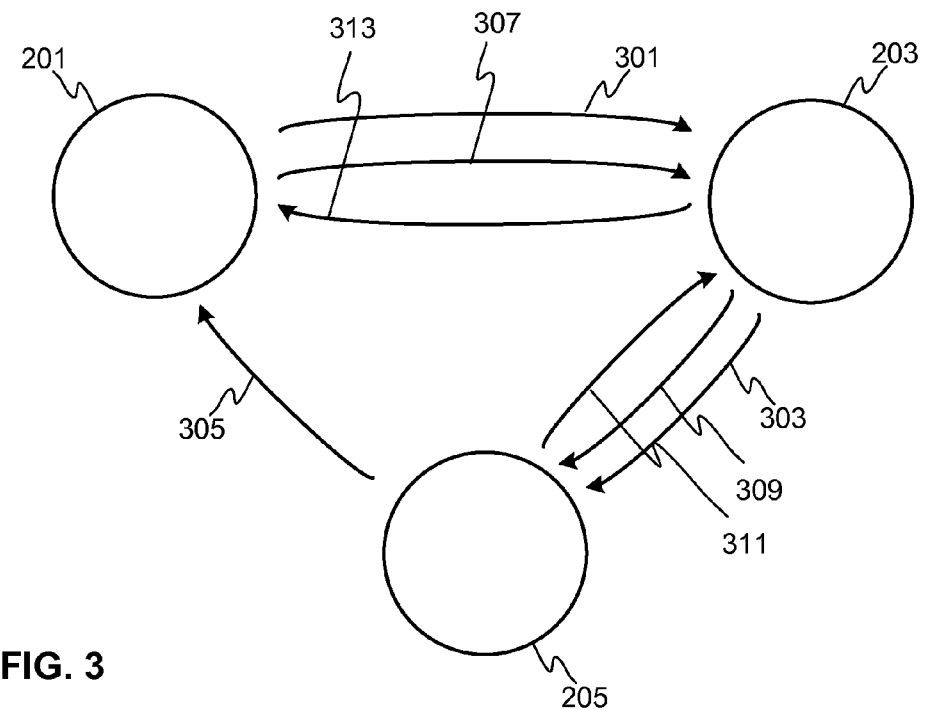
FIG. 3 illustrates another embodiment of the invention in which the method is applied.

FIG. 3 illustrates another embodiment in which the method of the invention described is applied. The embodiment comprises the same entities as described in the description of FIG. 2. Here the user in the user entity 201 accesses 301 web shop entity 203 by means of a terminal connected to the Internet. The user makes his/her purchases and during the purchase session the user gives some user-related identification information, such as a credit card number, to acquire a transaction code for accomplishing the online shopping session. The web shop entity 203 delivers 303 the information to the financial institution entity 205. By means of the identification information, such as social security number, the financial institution entity 205 is able to find information on the credit card holder and generate a transaction code to be utilized in online shopping. The financial institution entity stores information on the generated transaction code in the context of a data record relating to the credit card holder. The stored information can comprise the generated transaction code or any other information by means of which the validity of a transaction code received through a web shop entity 203 from the user can be verified. The generated transaction code is delivered 305 to the user entity 201 from the financial institution entity 205 according to information defined in the database containing information on users. Preferably, the information comprises e.g. a mobile phone number of the user. In the next phase, the user inserts 307 a transaction code during the online shopping session, which is further delivered 309 among other necessary information for identifying the user to the financial institution entity 205 for verification. The financial institution entity 205 finds the stored information of the credit card holder based on the other necessary information for identifying the user and compares the inserted transaction code with the generated transaction code stored in the context of a data record relating to the credit card holder. If a match is found, the financial institution entity 205 confirms 311 the payment with a predefined message to the web shop entity 203. A confirmation 313 of a successful online purchase can finally be delivered 311 to the user entity 201.

Figure 4:
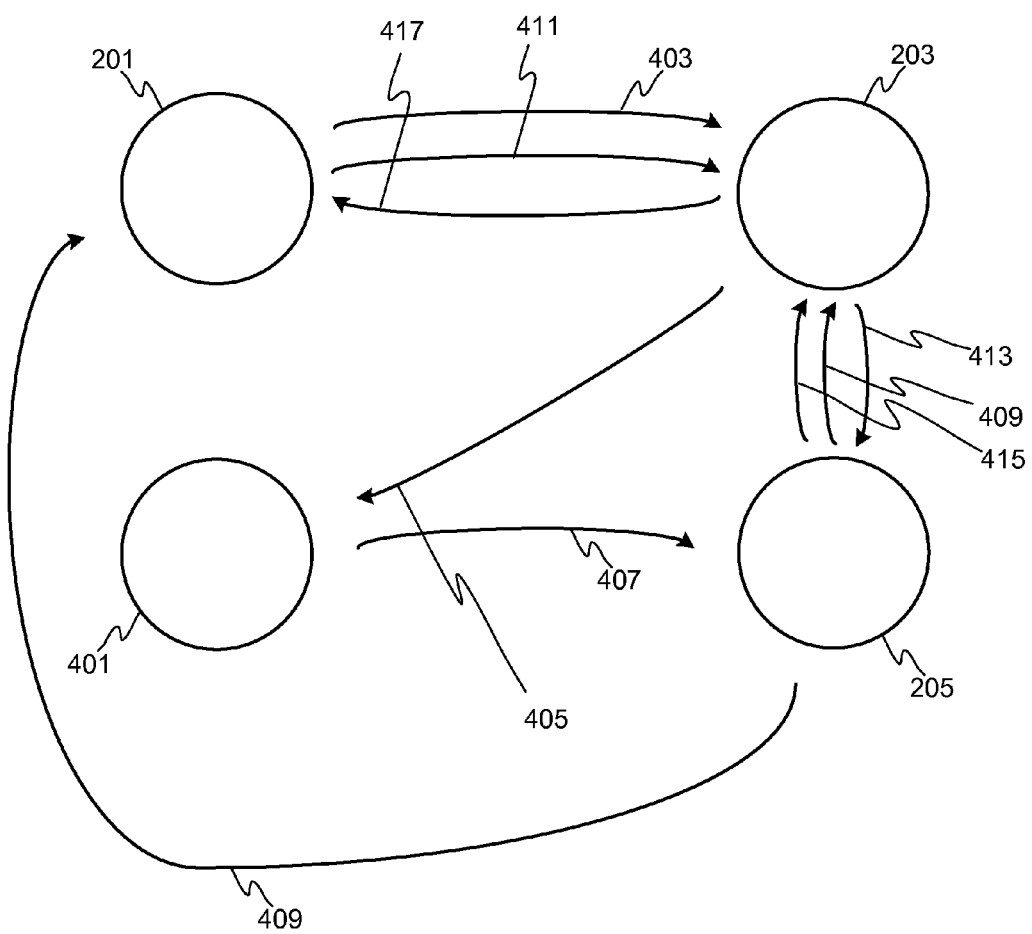
FIG. 4 illustrates a further embodiment of the invention in which the method is applied.

FIG. 4 illustrates a further embodiment of the invention in which the identification of a user is decentralized. In addition to previously described entities a new entity for identifying the user is introduced. Here such an entity is a telecom operator whose customer the user is. According to this embodiment the user has accessed 403 the web shop and inserted some personal information on himself or herself and wants to make purchase. For user identification purposes the web shop entity 203 delivers 405 the user related identification information to telecom operator entity 401. The telecom operator entity 401 comprises necessary means for storing user information for identification purposes. According to a solution according to this embodiment personal information stored in the billing system of the telecom operator entity 401 can be used. If a match is found between the information delivered from the web shop entity 203 and the stored information the telecom operator entity 401 can deliver a request 407 for a transaction code to the financial institution entity. The request comprises information on the user requesting a transaction code. The delivered information can be e.g. a social security number so that the financial institution entity is able to retrieve user data from their systems based on that information. In response to the request the financial institution entity generates a transaction code, stores information on it and delivers 409 it to the user requesting it. The delivery can be accomplished by means of SMS. In such a case the address i.e. mobile phone number of the user can be found in a database in the financial institution entity or the telecom operator delivers it together with the transaction code request. In response to receiving the transaction code the user inserts 411 a transaction code to the service of the web shop entity, which further delivers 413 it to the financial institution for verification. The inserted transaction code information is compared to the stored data and if a match can be found the web shop enables the completion of the purchase by delivering a confirmation 415 to the web shop entity which further grants a confirmation 417 to the user in the user entity.

According to the invention the network element in the financial institution entity comprises means for receiving a request for a transaction code and recognizing information included in the request. The information to be recognized contains identification information on the user for whom a transaction code is to be generated. According to some embodiments of the invention the network element is configured to recognize e.g. a social security number, credit card number, pre-agreed PIN and/or contact information such as a mobile phone number in the request. The network element is configured to find user related information in its storage means by means of the recognized identification information derived from the request. If a comparison of the user related information in the storage and the recognized identification information in the request indicates a match, the network element is configured to generate a transaction code and store information on the generated transaction code in the storage means in context of the user identified from the request. According to some embodiments of the invention the generated transaction code is stored in the same record as the traditional CVC code. According to some further embodiment of the invention the generated transaction code comprises an amount of digits different from the traditional CVC (3 digits). The advantage of such a solution is that the financial institution entity is able to differentiate the users of the traditional CVC from the users of a more sophisticated transaction code for their needs. After generation and storage of the transaction code it is delivered to the user through an agreed communication channel. Furthermore, the network element is configured to receive a payment verification request from a web shop entity. The payment verification request comprises information on a credit card and an inserted transaction code. Based on the credit card information such as a credit card number the network element is able to find information relating to the card holder in its storage and detect a stored transaction code in the storage. The network element comprises means for comparing the information in the payment verification request to the stored information and if a match is found, the network element is configured to send a confirmation of secure payment back to the web shop entity. Such means may be arranged with a computer program product executed in a processing means, e.g. a processor, of a network element and/or system More specifically, the network element is configured to confirm payment information in an online shopping environment. This is achieved by means of processing means in the network element which is configured to analyze the received message from a transaction code requesting party and which, based on at least a content of the message representing predefined user-related identification information, is further configured to compare at least the received predefined user related identification information to stored user-related identification information in the storage means of the network element. In response to a positive outcome of the comparison, the processing means is configured to generate a transaction code, to store information on the generated transaction code in the storage means of the network element and to deliver the generated transaction code to the requesting party. The processing means are further configured to analyze at least an inserted transaction code for verification in a confirmation request, to compare at least the inserted transaction code to the generated transaction code stored in the storage means, and in response to a positive outcome of the comparison to confirm the payment information to a requesting first entity.

As already discussed above, the network element comprises necessary communication means for communicating with a party requesting a transaction code and with an entity requesting confirmation for an inserted transaction code. If necessary, the communication means can be utilized by any other party for implementing the method according to the invention, e.g. a party carrying out the user recognition.

Further, the network element in the financial institution entity is configured to store such user related identification information which is desired by a user. The user can, e.g. when acquiring a credit card, himself/herself select identification information to be used and that information is stored in the network element to be utilized in the context of a transaction code generation. In some other embodiments of the invention the network element is configured to update the identification information periodically. In a still further embodiment of the invention the user may update i.e. e.g. renew the identification information stored in the network element. The update can be made with e.g. a control access system which the user needs to sign into with specific user access information which is fully separate from the credit card or any other information relating to the use of the credit card in e.g. web shopping.

The network element according to some embodiment of the invention comprises a counter for maintaining a value for the number of attempts to insert a transaction code during a web shop session. According to an embodiment of the invention a maximum limit of attempts is set in order to prevent misuse. If it is noticed that there is a mismatch between the stored transaction code and/or other information stored in the financial institution entity and inserted transaction code and/or other information, the web shop is notified and the counter is updated. When the maximum limit set for the counter is reached, the financial institution may notify the web shop entity that the payment transaction is canceled. According to some embodiment of the invention the counter is set for maintaining a value for counting the validity time of a transaction code delivered in response to the request. If the counter reaches the validity time limit before such a transaction code is inserted for confirmation, the network element is configured to invalidate the stored transaction code. In some embodiment of the invention the network element comprises two counters, one for maintaining the number of attempts and one for validity time measurement. The counters are configured to function similarly to the case of only one counter, but if either of the limits set for counters is reached, the verification is canceled.

The processing means in the network comprises at least one or more processor(s), which is configured to implement instructions defined in a computer program product. The processor may comprise an internal memory for storing at least part of the computer program product containing instructions relating to the operation of the network element. Alternatively or in addition, the network element may comprise storage means for storing the computer program products containing instructions relating to the operation of the network element. Such storage means can e.g. be at least one RAM, ROM or flash memory. Furthermore, the network element may comprise a one or more communication means for arranging and managing, with a help of instructions received from the processing means executing at least one computer program product, the communication with other elements in the network. The communication means may comprise an element for wired or wireless communications, such as a modem for a specific communication type. Furthermore, the network element may comprise necessary interfaces for input/output purposes.

A system for confirming payment information in online shopping environment according to the invention, in which a first entity requests confirmation with respect to transaction-related information from a second entity, comprises several entities in order to achieve the desired effect. Firstly, the system comprises a user entity, which is configured to request generation and delivery of a transaction code. The request comprises at least user related identification information, but may also comprise further information as described in the context of description of the method according to the invention. Secondly, the system according to the invention comprises a web shop entity, which offers an online shopping environment and is configured to request confirmation with respect to transaction related information received from a user entity. Thirdly, the system according to the invention comprises a financial institution entity, which is configured to receive a request for a transaction code containing at least pre-defined user related identification information from the user entity and to compare at least the received predefined user-related identification information to the stored information. In response to a positive outcome of the comparison to the financial institution entity, the system is configured to generate a transaction code, to store information on the generated transaction code and to deliver the generated transaction code to the user entity. The financial institution entity is further configured to receive at least an inserted transaction code for verification from the web shop entity, to compare at least an inserted transaction code to the generated transaction code stored, and in response to a positive outcome of the comparison to confirm the payment information to the web shop entity. Furthermore, the system may be configured to comprise a counter for maintaining a value for at least one of the following: number of attempts to insert a transaction code, validity time of the generated transaction code. Additionally, the system may be configured to enable updating of the user related information in the financial institution entity from the user entity.

The invention also relates to a computer program product for confirming payment information in online shopping environment, which comprises computer-executable instructions that when executed by processing means of a network element, the network element is configured to perform all the method steps described in the description herein. A non-transitory computer readable medium may be used to store non-transitory computer program product as described.

It is worthwhile to mention that if the comparison for the request for a transaction code shows a mismatch between the identification information delivered in the request and the information stored in the storage means, no transaction code is generated and delivered. In some embodiment of the invention a notification message can be delivered to the requesting party. In a similar manner, in the context of a payment verification request no confirmation is sent unless the match is found in the comparison.

The core of the invention is that fraudulent use of a credit card or stolen customer data from web shop is prevented in many different ways. Firstly, a 3rd party trying to illegally use e.g. a stolen credit card needs to know some personal identification information on the rightful owner of the credit card in order to be able to request a transaction code. Secondly, the 3rd party trying to illegally use e.g. a stolen credit card cannot get the generated transaction code unless the 3rd party has also been able to steal the terminal into which the transaction code is delivered according to contact information stored in the financial institution entity.

According to the invention described above the generated transaction code is intended to be used in a similar manner as CVC in a credit card. An advantage of the invention is that the transaction code can be physically separate from the credit card thus increasing the security of web shopping. Moreover, the security in view of the solution according to the invention can be increased by making the generated transaction code valid only for a predetermined duration, e.g. 2 hours from the generation. According to some embodiment of the invention a transaction code is valid for one transaction only and according to some other embodiment of the invention the transaction code is valid for multiple transactions in the same web shop only.

A further advantage of the invention is that implementation of the invention does not require major changes, if any, in the web shops due to the fact that the generation of a transaction code as well as verification of inserted transaction code may be separate from the web shop. The user just inserts a received transaction code in the purchase order in the same manner as the CVC code.

The different entities and technical elements inside these entities are described as examples for implementation and for enabling a clear description of the invention. It shall be understood that an element described above can be transferred under some other entity if needed and in a similar manner any described method step and/or functionality is transferable to be carried out in any other element or entity. Thus, any concept described in context of the specific examples provided in the description given above should not be construed as limiting. Therefore, the invention is not limited merely to the embodiments described above, many variants being possible.

What is claimed is:

1. A method for confirming payment information in an online shopping environment, wherein a first entity requests payment confirmation with respect to transaction-related information from a second entity, the first entity being a web shop entity, and the second entity being i) a party issuing identification information and also ii) a party confirming payment of an Internet shopping transaction to the web shop entity, the method comprising:

a) as part of a customer conducting an Internet shopping transaction with the web shop entity via a web shop session on a network channel of a telecom operator entity, providing, by the customer, personal user related identification information to the web shop entity;

wherein the web shop entity comprises servers and databases, the databases comprise information on products being sold by the web shop entity as well as web shop customer information, the web shop entity operatively connected to the telecom operator entity and to the second entity, wherein the second entity comprises servers and databases with stored information;

b) after receiving the personal user related identification information from the customer, delivering, by the web shop entity, the received personal user related identification information to the telecom operator entity for user identification purposes, wherein the telecom operator entity is a computer entity having a storage device that stores personal information of the customer;

c) matching, by the telecom operator, the personal user related identification information provided by the web shop entity with the personal information of the customer stored by the storage device of the telecom operator entity; and upon making the match, transmitting a request for a transaction code to the second entity, wherein the request for the transaction code contains at least a predefined user related identification information of the customer;

d) receiving, by the second entity, the request for the transaction code from the telecom operator entity, wherein the request contains at least the predefined user related identification information of the customer;

comparing, by the second entity, if the request is in a pre-defined structure and if at least the received pre-defined user-related identification information matches with stored personal user related identification information;

in response to an outcome of the comparison being that the at least the received predefined user-related identification information matches with the stored personal user related identification information and the request is in the pre-defined structure, i) generating the transaction code and storing information on the generated transaction code in a database of the second entity, and ii) delivering the generated transaction code to a mobile terminal of the customer, and iii) initiating and maintaining a counter representing a validity time of the generated transaction code;

e) after receiving the transaction code from the second entity and as part of making the Internet shopping transaction during the web shop session, inserting, by the customer, the transaction code for verification by the web shop entity;

f) receiving, by the web shop entity, at least the inserted transaction code for verification from the customer and then providing the received inserted transaction code for verification to the second entity as part of a shopping transaction payment verification;

g) comparing, by the second entity, the received inserted transaction code for verification to the generated transaction code stored in the database of the second entity and comparing if the counter has reached the validity time prior to receipt of the inserted transaction code from the web shop session; and h) in response to a detection that the received inserted transaction code matches with the stored transaction code and that the counter has not reached the validity time, delivering, by the second entity, a confirmation to the web shop entity.

2. The method as recited in claim 1, wherein the request for the transaction code is transmitted with a short message (SMS) over a mobile communication network.

3. The method as recited in claim 1, wherein the personal user related identification information is at least one of the following: a social security number (personal ID), a credit card number, PIN (personal identity number), home address, and mobile phone number.

4. The method as recited in claim 1, wherein the personal user related identification information includes user-defined identification information.

5. The method as recited in claim 1, wherein the personal user related identification information is updatable.

6. The method as recited in claim 1, the method further comprising: receiving a credit card number together with the inserted transaction code to be utilized in a comparison.

7. The method as recited in claim 1, the method further comprising: maintaining a counter for indicating a number of attempts to insert a transaction code.

8. The method as recited in claim 1, wherein
in said step of delivering the generated transaction code to the mobile terminal of the customer, the generated transaction code is sent via a pre-determined communication network agreed to in advance by the customer, wherein information identifying agreed-to pre-determined communication network is stored in the database of the second entity.

9. The method as recited in claim 8, wherein the pre-determined communication network is a mobile communication network and the generated transaction code is sent to the mobile terminal with an SMS.

10. The method as recited in claim 8, wherein the pre-determined communication network is the Internet and the generated transaction code is sent to the mobile terminal by email.

11. The method as recited in claim 8, wherein the second entity is a financial institution.

12. The method as recited in claim 1, wherein the user-related identification information comprises a mobile phone number.

13. A network element comprising a processor configured to confirm payment information in an online shopping environment,
wherein the processor is configured i) to communicate with a customer conducting an Internet shopping transaction, a telecom operator entity having a storage device that stores personal information of the customer, and a web shop entity, and ii) to store at least user related identification information in a database of the network element,
and iii) to analyze a request received from the telecom operator entity requesting a transaction code, wherein the request is in a pre-defined structure and contains predefined user related identification information of the customer;
wherein the processor is further configured, upon receiving the request for the transaction code from the telecom operator entity, to compare whether the request is in a pre-defined structure and whether the received predefined user-related identification information matches with the stored user related identification information;
and in response to an outcome of the comparison being that the request is in the pre-defined structure and the received predefined user-related identification information matches with the stored user related identification information, the processor configured to:
i) generate the transaction code and store information on the generated transaction code in a database,
ii) deliver the generated transaction code to a mobile terminal of the customer, and
iii) initiate and maintain a counter representing a validity time of the generated transaction code;
upon receiving from the web shop entity a message with the transaction code, as inserted by the customer during the Internet shopping transaction as part of a shopping transaction payment verification, the processor configured to:
first, compare the received inserted transaction code to the generated transaction code stored in the database and compare whether the counter has reached the validity time prior to receipt of the inserted transaction code from the web shop entity, and
second, in response to a detection that the received inserted transaction code matches with the stored transaction code and that the counter has not reached the validity time, to deliver a confirmation to the web shop entity.

14. The network element as recited in claim 13, wherein the network element further comprises: a counter for maintaining a value for at least one of the following: a number of attempts to insert a transaction code, validity time of the generated transaction code.

15. The network element as recited in claim 13, wherein the processor is further configured to recognize the customer by information stored in the database and enable the customer to access the stored user related information for updating purposes.

16. A system for confirming payment information in an online shopping environment, wherein a first entity requests confirmation with respect to transaction related information from a second entity, the system comprising:
a user entity device of a user entity configured to make an Internet shopping transaction, via a web shop session conducted over a network of a telecom operator entity, with a web shop entity; wherein the user entity is a customer of the telecom operator entity;
the web shop entity, wherein the web shop entity is configured to offer an online shopping environment comprising of servers and databases, wherein the databases comprise information on products being sold by the web shop entity as well as web shop customer information, the web shop entity further configured to request confirmation with respect to transaction-related information received from the user entity; and
the web shop entity further configured to after receiving user related identification information from the customer, deliver the received user related identification information to the telecom operator entity for user identification purposes wherein the telecom operator entity is a computer entity having a storage device that stores personal information of the customer;
the telecom operator entity, wherein the telecom operator entity is configured to match the user related identification information provided by the web shop entity with the personal information of the customer stored by the telecom operator entity, and upon making the match, transmit a request for a transaction code to a financial institution entity issuing identification information wherein the request for the transaction code contains at least a predefined user related identification information of the customer;

the financial institution entity, wherein the financial institution entity comprises servers and databases with stored information, and configured to:

receive the request for the transaction code from the telecom operator entity, and compare if the request is in a pre-defined structure and if at least the received predefined user related identification information from the request matches with user related identification in the stored information of the databases of the financial institution;

and in response to an outcome of the comparison being that the request is in the pre-defined structure and the at least the received predefined user related identification information from the request matches with the stored user related identification information of the databases, generate a transaction code and store information on the generated transaction code in one of the databases of the financial institution; initiate and maintain a counter representing a validity time of the generated transaction code; and deliver the generated transaction code to a mobile terminal of the user entity;

the financial institution entity being further configured to:

receive at least an inserted transaction code from the web shop entity, compare if the counter has reached the validity time prior to receipt of the inserted transaction code from the web shop entity;

and compare the inserted transaction code to the generated transaction code stored in the one of the database of the financial institution;

and in response to a detection that the inserted transaction code matches with the stored transaction code and that the counter has not reached the validity time, deliver a confirmation to the web shop entity.

17. A computer program product stored on a non-transitory computer readable medium for confirming payment information in online shopping environment, wherein the computer program product comprises computer-executable instructions that when executed by a processor of a network element, the network element is configured to perform the steps of a method for confirming payment information in online shopping environment, the method comprising:

as part of a customer conducting an Internet shopping transaction with a web shop entity via a web shop session on a network channel of a telecom operator entity, providing, by the customer, personal user related identification information to the web shop entity, wherein the web shop entity comprises servers and databases, the databases comprise information on products being sold by the web shop entity as well as web shop customer information, the web shop entity operatively connected to the telecom operator entity and to a second entity, wherein the second entity is a party issuing identification information and a party confirming payment of the Internet shopping transaction;

wherein the telecom operator entity is a computer entity having a storage device that stores personal information of the customer, and the second entity comprises servers and databases with stored information;

after receiving the user related identification information from the customer, delivering, by the web shop entity, the received user related identification information to the telecom operator entity for user identification purposes;

matching, by the telecom operator entity, the user related identification information provided by the web shop entity with the personal information of the customer stored by the telecom operator entity, and upon making the match, transmitting a request for a transaction code to the second entity, wherein the request for the transaction code contains at least a predefined user related identification information of the customer;

receiving, by the second entity, the request for a transaction code, wherein the request contains the at least predefined user related identification information;

comparing, by the second entity, if the request is in a pre-defined structure and if at least the received pre-defined user-related identification information matches with stored user related identification information, and in a response to an outcome where the request is in the pre-defined structure and the at least the received predefined user-related identification information matches with the stored user related identification information, i) generating a transaction code and storing information on the generated transaction code in a database of the second entity, and ii) delivering the generated transaction code, over a mobile communication network of the telecom operator entity, to a mobile terminal of the customer, and iii) initiating and maintaining a counter representing a validity time of the generated transaction code;

during the web shop session and after having received the generated transaction code from the second entity, inserting, by the customer, at least the transaction code for verification of the Internet shopping transaction;

as part of the web shop session, receiving, by the web shop entity, at least the inserted transaction code for verification from the customer and providing the received inserted transaction code for verification to the second entity as part of a shopping transaction payment verification;

comparing, by the second entity, the received inserted transaction code for verification to the generated transaction code stored in the database of the second entity and comparing if the counter has reached the validity time prior to receipt of the inserted transaction code from the web shop session, and in response to a detection that the inserted transaction code matches with the stored transaction code and that the counter has not reached the validity time, delivering, by the second entity, a confirmation to the web shop entity.

* * * * *